Oct. 13, 1953 J. W. WOOLF 2,655,567
REEL CONTROLLING APPARATUS FOR CABLE REELS OF MINE CARS
Filed July 15, 1949 3 Sheets-Sheet 2
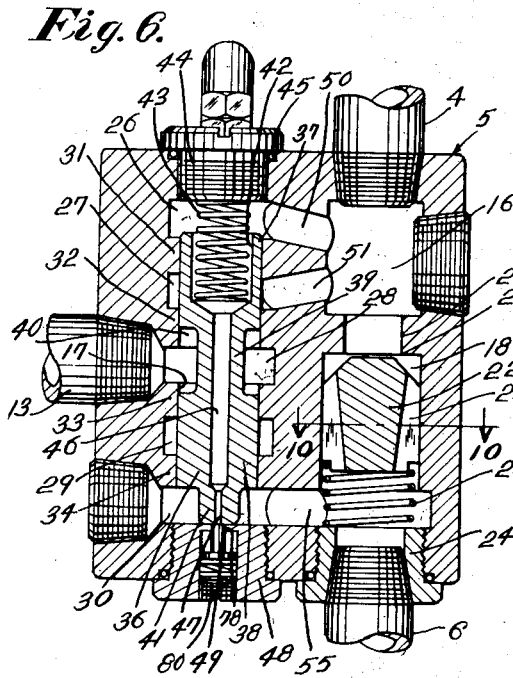
Fig. 6.
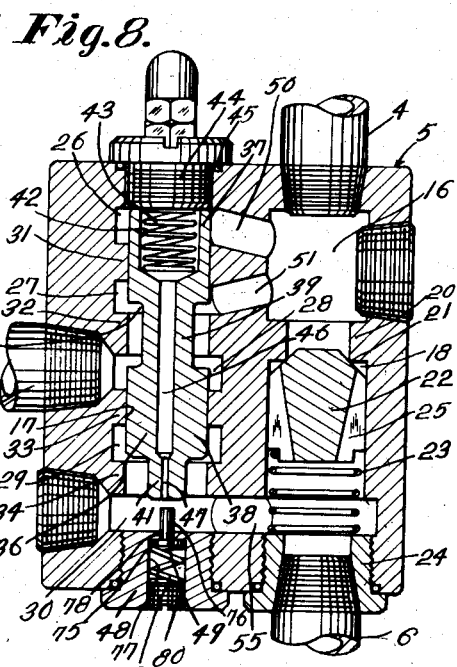
Fig. 8.
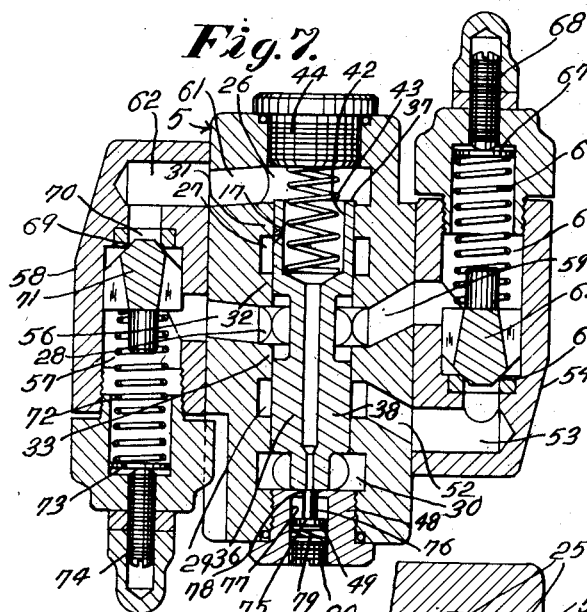
Fig. 7.
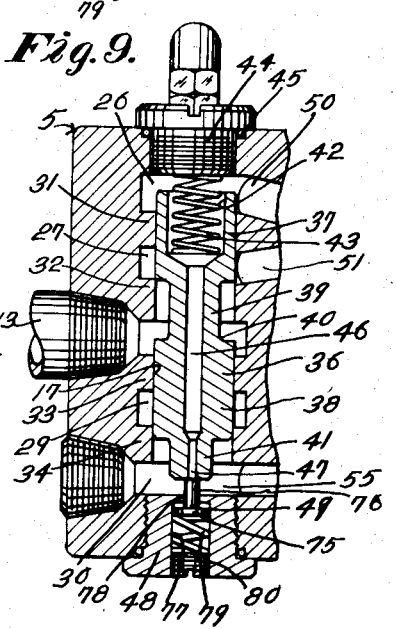
Fig. 9.
Fig. 10.
Inventor:
James W. Woolf.
by Louis A. Maxon
attorney.

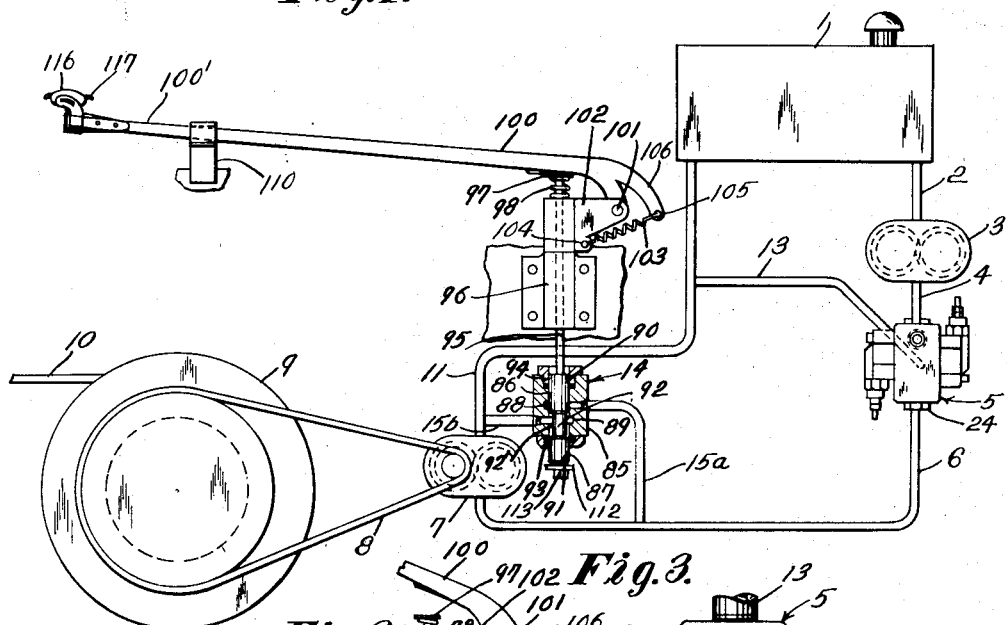

Oct. 13, 1953 J. W. WOOLF 2,655,567
REEL CONTROLLING APPARATUS FOR CABLE REELS OF MINE CARS
Filed July 15, 1949 3 Sheets-Sheet 3

Inventor:
James W. Woolf.
by Louis A. Maxam.
Attorney.

Patented Oct. 13, 1953

2,655,567

UNITED STATES PATENT OFFICE 2,655,567

REEL CONTROLLING APPARATUS FOR CABLE REELS OF MINE CARS

James W. Woolf, Franklin, Pa., assignor to Joy Manufacturing Company, Pittsburgh, Pa., a corporation of Pennsylvania Application July 15, 1949, Serial No. 104,904

16 Claims. (Cl. 191—12.2)

My invention relates to reel controlling apparatus, and more particularly to reel controlling apparatus for the cable reels of shuttle cars.

Shuttle cars are transport vehicles which are ordinarily used in underground mining. They are propelled by power which may in some cases be derived from storage batteries but which is more commonly obtained through connections with the electric power system of the mines in which the cars are used. The present invention relates more particularly to shuttle cars of the latter type. Overhead conductors are generally strung around the mine in the portions thereof which are most used, and are advanced as the working out of the coal or other mineral progresses. These trolley lines do not, however, extend generally close up to the working faces, and accordingly the shuttle cars frequently have to operate where there are no trolley wires with which contact elements on the trolley poles carried by the shuttle cars can make direct contact. Accordingly, the shuttle cars will be equipped not only with a trolley pole—ordinarily one provided with a pair of contact elements, one to cooperate with each trolley wire—but also with cable reels having cables wound on the reels and connectible at their free ends with the trolley wires in such a manner that the shuttle cars may operate over a substantial distance, perhaps on the order of some hundreds of feet, from the point of connection of their cables with the fixed trolley wires.

It will be evident that when the driving motor or motors of a shuttle car are to be provided with current from a cable, the trolley pole may desirably be held down out of the way, and it will be evident that when the shuttle car is to be propelled by power received through the trolley devices, the cable will desirably be all wound up on the reel in such a manner that there will be no danger of its being run over by the vehicle; and it will be also desirable, as shortly will be explained, not only not to supply any power to effect reel rotation, but also to conserve power by relieving the load on the device which normally supplies power to effect reel rotation. One further preliminary statement may be helpful. Shuttle cars are commonly provided with hydraulically operated steering mechanism, and it is common to effect cable reel rotation by hydraulic fluid under pressure.

It is common to use separate pumps for the two functions of fluid supply to effect reel rotation and fluid suply for steering, but both pumps are ordinarily driven by a common motor, and accordingly the motor is ordinarily in operation whenever the vehicle is being propelled, and, in the absence of my invention, when the reel is not to be used for a while either to wind in or pay off cable, a considerable amount of power can be saved because the reel is driven by a pressure on the order of three to four hundred pounds per square inch during cable winding operation, and this pressure is commonly exerted on the reel driving motor even when the reel is stationary. It will be apparent from what has been said that it is desirable to conserve power when a shuttle car is being furnished by power by its trolley pole, by relieving of substantially its entire load a pump whose function it is to furnish hydraulic fluid for driving a reel winding motor, and to interrupt completely the drive of the reel driving motor. It is, moreover, desirable to do this automatically, and to do so by the movements of the trolley is a highly convenient manner of control.

It is an object of the present invention to provide an improved arrangement for the control of the power supply means to a mine vehicle, such as a shuttle car. It is another object of the present invention to provide an improved control for the drive of a motor-pump device constituting a reel driving and controlling element for the cable reel of a shuttle car or other mine vehicle. It is a further object of my invention to provide an improved arrangement for reducing the power consumption of a hydraulic pump supplying power for effecting operation of a reel driving motor whereby at such times as the cable reel may not be required to function for the winding in and paying out of cable, the same may be entirely freed from rotating forces and power may be conserved, this condition being effected under the control of a trolley pole constituting an alternative means of power supply for propulsion of the shuttle car or other vehicle. A more specific object of the invention is to provide a multiple power supply means for a shuttle car or the like—one a trolley pole and the other a cable reel and power cable, with a motor-pump device associated with the reel between a fluid reservoir and a continuously driven pump, and to provide a bypass around the motor-pump device having a control therefor shiftable under the control of the trolley pole as the latter is raised and lowered, whereby, when the trolley pole is being used the bypass may be opened and the motor-pump device may be freed of any substantial torque-producing fluid pressure. Other objects and advantages of the invention will hereinafter more fully appear.

Referring to the drawings, in which a preferred embodiment of my invention is shown for purposes of illustration.

Fig. 1 is a diagrammatic view illustrating a form of fluid circuit and elements associated therewith, arranged in accordance with the preferred embodiment of my invention, for driving and controlling a motor-pump device operatively connected with a cable reel, the cable upon which constitutes, with a trolley pole, a dual system of power supply for a shuttle car including propulsion motors and pump means for supplying hydraulic fluid under pressure to steering means and to a cable reel drive, and a third motor means being provided, also supplied with current as aforesaid, for operating the conveying mechanism of a shuttle car or the like for distributing the load over the bottom thereof and for effecting discharge of the load at appropriate times and places.

Fig. 1a is a perspective view of the current collecting end of the trolley pole.

Fig. 2 is a fragmentary view showing the trolley pole in a different position, and also showing a by-pass valve in a different position.

Fig. 3 is an enlarged end view of a relief and control valve mechanism shown in Fig. 1, the view being taken from what might be called the top, the by-pass valve shown in Fig. 1 being considered, for purposes of reference, actually to be disposed or positioned as there shown.

Fig. 4 is a side view of the relief and control valve mechanism of Fig. 3, the view being from the left hand side thereof with the mechanism in the position as indicated in Fig. 1.

Fig. 5 is a top plan view of the relief and control valve mechanism in the position corresponding to that of Fig. 1, but the scale being larger.

Fig. 6 is an enlarged sectional view on the plane of the section line 6—6 of Fig. 5 through the relief and control valve mechanism.

Fig. 7 is an enlarged sectional view taken on the plane of the line 7—7 of Fig. 4.

Fig. 8 is a sectional view on the same plane and scale as Fig. 6 but with the parts shown in different relative positions.

Fig. 9 is a sectional view on the same plane as Figs. 6 and 8, showing the shifter valve in still another position, the right hand portion of the valve mechanism being broken away.

Fig. 10 is a fragmentary sectional view taken on the plane of the line 10—10 of Fig. 6.

Figure 11:
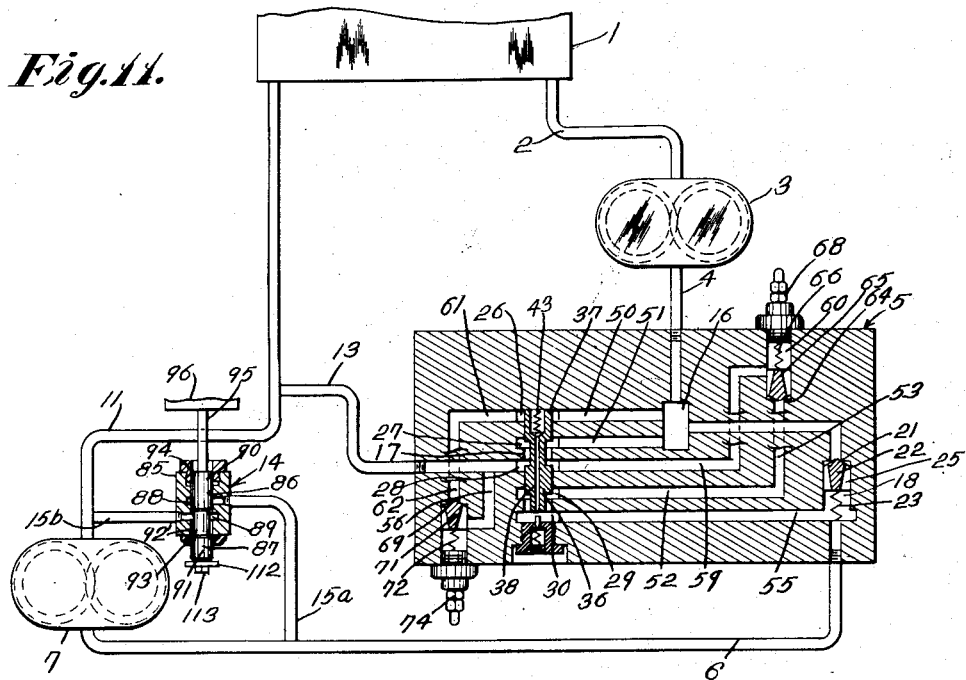
Figs. 11 and 12 are views similar to Fig. 1 but showing the relief and by-pass valve mechanism in a developed or schematic manner so that all of the passages therethrough and elements thereof may be noted in their working operations.
Figure 12:
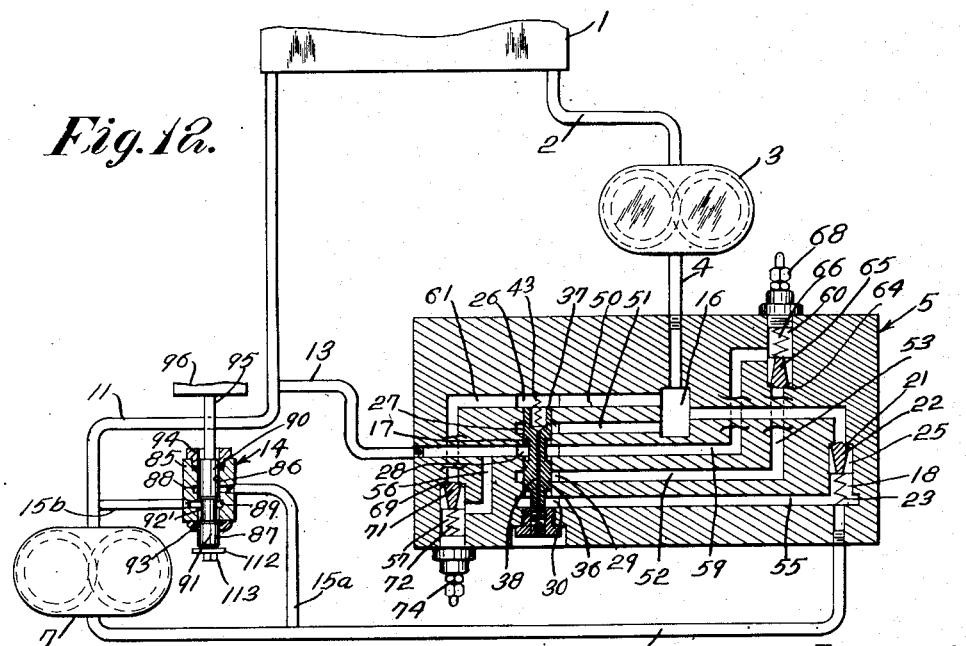

Referring now to the drawings, and first to Figs. 1, 11 and 12, it will be noted that a reservoir or tank 1, constituting a source of hydraulic fluid, is provided to contain the necessary quantity of such fluid for the driving and controlling of the reel and for other purposes requiring hydraulic fluid, such as steering and, when a vertically adjustable discharge section is employed, the elevation of the discharge end of the conveyor associated with the vehicle. The reservoir 1 is connected by a suction line 2 with a pump 3, which is continuously driven, as by an electric motor (not shown), at all times when power is being delivered to the shuttle car or other mine vehicle. Another pump (not shown) may be driven simultaneously with the pump 3 and have the fluid delivered by it used for steering, etc. as above suggested. This fact is referred to only as explaining why the pump 3 is continuously driven. The pump 3 delivers fluid under pressure to a line 4 which is connected with a relief and shifter valve mechanism generally designated 5, which has a connection 6 leading to a motor pump device 7. This motor pump device 7 is operatively connected, as by a belt or chain 8, with a cable reel 9 upon which a power supply cable 10 is wound. While my invention is specifically described with reference to a cable reel carrying an electric cable for supplying current to electric motors, the invention is not limited to such systems, but includes within its contemplation reels for flexible conductors for other operating media. The motor pump device 7 is connected with a conduit 11 which leads back to the reservoir or source 1, and a relief line 13 leads from the valve mechanism 5 to the line 11. The pump 3 is shown, though it is not necessarily so constructed, as of the intermeshing gear type, as is also the motor-pump device 7. The specific details of construction of the pump 3 and motor-pump device 7, and even the types thereof, are not essential to the invention, and such devices are so well known per se that they are not more extensively illustrated. Means is provided for permitting the by-passing of the motor pump device 7, in the form of a by-pass valve 14 shown as interposed between conduit sections 15a and 15b, the former connecting the by-pass valve device 14 with the conduit 6 and the latter connecting the by-pass valve device 14 with the conduit 11. Conduit 15a might communicate directly with conduit 4, of course, and conduit 15b directly with the reservoir or with the conduit 13. The structure of the by-pass valve device 14 and the operating means therefor will later be more fully described.

The valve mechanism 5 is of the construction described and claimed in the application of Richard J. Hopkins, Serial No. 24,558, filed May 1, 1948, of which a continuation, Serial No. 338,790, was filed February 25, 1953, and is but illustrative of other forms of mechanisms which might be employed for the accomplishment of like functions. It provides a chamber 16 to which hydraulic fluid is delivered by the conduit 4. From the chamber 16 fluid may be delivered through a shifter valve chamber 17 to the connection 13 leading to the source 1 or, as will shortly be explained, to another chamber 18 which is connected with the conduit 6 leading to the motor-pump device 7 and which communicates also with the shifter valve chamber 17 as will later be described. Desirably, the chambers 16 and 18 may be arranged in line with each other, as shown in Figs. 6 and 8, and separated by a ported septum 20 which provides a valve seat 21 which a check valve 22 is adapted to engage and against which said check valve is adapted normally to be maintained by a spring 23 which at one end engages the check valve and at its other end rests upon a plug 24 with which the conduit 6 is threadedly or otherwise suitably connected. The chamber 16 communicates with the chamber 18, of course, when the check valve 22 is unseated. Fig. 10 will aid in the comprehension of the structure of the check valve 22, and from this figure it will be noted that the valve has a number of slots 25 in its periphery through which fluid may flow from the chamber 16 to the chamber 18 when the valve 22 is unseated.

The shifter valve receiving chamber 17 includes five annular chambers, each spaced from the next adjacent chamber by a ported partition. Starting from the top in Fig. 6, these annular chambers are successively numbered 26, 27, 28, 29 and 30. A ported partition 31 separates the chambers 26 and 27. A ported partition 32 separates the chambers 27 and 28. In like manner, ported partitions 33 and 34 respectively separate the chambers 28 and 29 and the chambers 29 and 30. Each of the ported partitions has the port therethrough of the same size as each of the others, said several ports being coaxially arranged so that their surrounding walls provide guidance for a two-spooled shifter valve 36 comprising an upper hollow spool 37, a lower spool 38, a connecting portion 39 of reduced diameter, by reason of which an annular fluid conducting groove 40 is provided between the spools 37 and 38, and a stop projection 41. The spool 37 has a chamber or recess 42 in it, and a spring 43 extends into the recess and engages the lower end of the latter, the upper end of said spring 43 contacting an abutment plug 44 suitably packed at 45 to prevent leakage. A port 46, of relatively small diameter at its lower end 47, where it extends through the stop projection 41, connects the chamber 42 in certain positions of the shifter valve with the space surrounding the stop projection 41. In other words, it connects the chambers 26 and 30, when open. The stop projection 41 of the valve is adapted to cooperate with a suitable abutment plug 48 and with a yieldingly mounted valve 49, of which more will be said shortly. The abutment plug limits the downward movement of the shifter valve 36 and the valve 49 maintains closed the passages 46, 47 during its engagement with the projection 41.

The annular chamber 26 communicates with the chamber 16 through a port or cored opening 50. Similarly, the annular space 27 communicates through a port or cored opening 51 with the chamber 16. Annular chamber 28 communicates through the conduit 13 with the conduit 11 leading to the fluid source or reservoir 1. The annular chamber 29 communicates through a port or opening 52 with a chamber 53 in a relief valve casing 54, shown in the drawings as a separate element from the main body of the valve mechanism as a whole, but obviously formable with it as a unit if desired. The annular chamber 30 communicates through an opening 55 with the chamber 16. The annular chamber 28 also communicates through a port opening 56 with a chamber 57 in another relief valve housing 58. The annular chamber 28 further communicates through an opening 59 with a chamber 60 in the relief valve casing 54. The annular chamber 26 communicates through an opening 61 with a chamber 62 in the relief valve housing 58. The chamber 53 is separated from the chamber 60 by a ported valve seat 64 with which a spring pressed relief valve 65 is adapted to cooperate. A spring 66 having a follower 67 is adjustably loaded by an adjusting screw and nut mechanism 68, which controls the compression of the spring 66 and thus determines the pressure at which the valve 65 will lift from the seat 64. A valve seat 69 surrounding a port 70 extending between the chambers 57 and 62 is adapted to be engaged by a relief valve 71 pressed in a closing direction by a spring 72 which engages a follower 73 whose position may be adjusted by a suitable screw and nut mechanism 74. The valves 65 and 71 have flow-slots in the manner of valve 22. It will be observed that when the valve 36 is in top position, it does not prevent communication between the chamber 16 and the port 70. The normal compression of the spring 72 will be much higher than the normal compression of the spring 66, when their controlling valves have equal areas subjected to pressures tending to unseat such valves. For example, it may require a liquid pressure of 300 p. s. i. in chamber 62 to unseat valve 71, while for example a pressure of 100 p. s. i. in chamber 53 will suffice to unseat valve 65.

The valve 49 consists of a head portion 75 and a plunger portion 76, the head portion being slidably received in a chamber 77 formed in the abutment plug 48, and the plunger portion 76 extending through a reduced opening 78 coaxial with the chamber 77. A spring 79 engages the head portion at one end, and at its other end engages an adjustable threaded follower 80, and the pressure exerted by the spring 79 may be determined by the adjustment of its follower 80. Normally the spring 79 tends to maintain the plunger 76 in the position shown in Fig. 8, but the valve 49 may be depressed to the position shown in Figs. 6 and 7, and the plunger portion 76 is adapted to seal the opening 47 in the several positions of the shifter valve illustrated in Figs. 6, 7 and 9 but does not seal the opening 47 in the position of the shifter valve shown in Fig. 8. It may further be noted that sealing of the opening 47 by the plunger portion 76 will be discontinued as the shifter valve 36 moves upward, only, with the proportions shown, when the shifter valve reaches a position at which the flow of fluid through the port 51 and through the annular recess or groove 28 and the connection 13 has commenced. This means that the shifter valve will be sharply thrown, as the pressure at its upper end will drop when chamber 16 is connected with vent line 13. The mode of operation of the valve element 49 and its cooperation with the other parts of the mechanism will be more fully explained shortly.

The pump 3 may be considered, for the purposes of explaining the mode of operation of the invention, to be driven continuously while the vehicle is in use. Accordingly, it is taking liquid from the reservoir or source 1, through the conduit 2, and discharging it through the conduit 4 into the chamber 16, and the fluid that enters the chamber 16 must obviously go somewhere. Some of it, if the cable can be reeled in, can go through the conduit 6 after passing the check valve 22, and cause the motor-pump device 7 to operate as a motor and effect a winding in of the cable 10, and then pass back to the source 1 through the conduit 11. However, the rate at which the cable can be wound in may and probably will be entirely insufficient to permit all of the fluid delivered by the pump 3 to pass through the motor-pump device 7 and, indeed, it is possible that the motor-pump device may be entirely incapable of winding in the cable at all, as when the vehicle is at a standstill. Therefore, some of the liquid delivered to the chamber 16 must go elsewhere, and this it will do, passing by way of the passage 50, the annular groove 26, the passage 61, the chamber 62, the port 70, past the check valve 71, through the chamber 57, the passage 56, the groove 28, and the conduit 13 into the return line 11 and back to the source or reservoir 1. The pressure of the spring 72 will be made sufficient to compel the desired pressure to be maintained in the chamber 16, and in the conduit 6. For example, a pressure of 300 p. s. i. may be maintained in the fluid supply connections to the motor-pump device 7 by the appropriate setting of the spring 72. In Figs. 11 and 12, it may be noted that in order to avoid overlapping ports the connection of the conduit 13 with the chamber 28 is shown as made by way of a portion of the conduit 56 instead of opening into the chamber 28 separately from the port 56 and at right angles to the communication of that port with the chamber 28. Fig. 12, subject to the understanding just expressed, may be considered to show the normal position of the parts during the operation of the motor-pump device 7 as a motor to effect winding in of the cable 10—in other words, the mode of operation which takes place when the vehicle is moving in a direction to shorten the free length of the cable. At this time the shifter valve 36 occupies the position shown in Figs. 6 and 7 as well as Fig. 12, and is held in that position by reason of the facts (a) that the hydraulic pressure on its lower end is less than the hydraulic pressure on its upper end by the amount occasioned by the presence of the spring 23, and (b) that the spring 43 operates to hold the shifter valve 36 in the position mentioned.

If the vehicle is brought to a stop, the motor-pump device 7 will no longer drive the reel to wind in the cable, because the cable cannot then ordinarily be wound in; but there will be nothing which will occur in the controlling apparatus which would cause movement of the shifter valve 36 to reduce the pressure imposed on the motor-pump device 7 and so the cable will remain under undiminished tension while the vehicle is at a standstill. It will be noted that in the position of the shifter valve 36 shown in Figs. 6, 7 and 12, the lower end of the projecting portion 41 engages the top surface of the plug 48 and the plunger portion 76 of the valve 49 contacts the end of the projecting portion 41 and acts as a valve associated with the passage 47, and, because the spring 79 is strong enough to maintain this contact against the pressure for which the relief valve 71 is set, no flow through the passage 47 downwardly or upwardly will be possible until the shifter valve is moved up such a distance that contact between the plunger portion 76 of the valve 49 and the lower end of the projecting portion 41 of the shifter valve is interrupted.

Now suppose that the vehicle is caused to move in the direction which will necessitate the unwinding of the cable from the reel in order for such motion to take place. The tension of the cable will require the motor-pump device 7 to rotate in such a direction as to pump fluid taken in through the conduit 11 into the conduit 6. This fluid will pass into the chamber 18, but cannot pass the valve 22, and it also will be unable to pass the shifter valve 36 in the lower portion of that valve. Accordingly there will be an instantaneous building up of pressure below the shifter valve 36 to a value in excess of the fluid pressure existing on the top of that valve supplemented by the strength of the spring 43, and the shifter valve will start to move upward. The valve 49 will be moved upward by the spring 79 as long as there is no contact between the head portion 75 of the valve 49 and the portion of the plug 48 above the bore 77. Thus there can be no flow of fluid from the space below the shifter valve to the space above it, and the greater pressure below this valve will be maintained until the shifter valve gets well under way and preferably moves upward to such a point that the groove 40 can connect the port 51 with the annular chamber 28 and with the conduit 13 and thus permit a relief of the pressure at the upper end of the shifter valve. After this relief in pressure takes place, it will require no great pressure below the shifter valve to complete its travel and to maintain it in raised position, and when the shifter valve reaches top position the fluid pumped by the motor-pump 7 will be permittted to pass through the opening 52 and past the lower set relief valve 65 into the port 59 and through annular chamber 28 into the conduit 13, but it will be noted that the pressure acting to maintain the shifter valve in raised position will still exceed the pressure tending to force it down again by reason of the fact that the force produced by the spring 43 and the freely venting discharge of the pump 3 will not be equal to the pressure resulting from the presence of the relief valve 65 with its loading spring 66.

To repeat, the back pressure on the main pump is completely removed except for such resistance as friction of the liquid in the passages may involve, when the shifter valve is maintained in top position, and this shifter valve will be maintained in top position because of the greater pressure imposed on its lower end by reason of the presence of the relief valve 65 and its loading spring 66, this relief valve being adapted to maintain a pressure of, for example, 100 p. s. i. in the chamber 53. By reason of the structure described, the tension on the cable 10 will be substantially reduced, and the reel may be turned backward, driving the motor-pump device 7 as a pump, with a much lower pressure in the line 6 than during the operation of the motor-pump device as a motor.

Now let it again be assumed that the vehicle stops. The motor-pump device 7 no longer acts as a pump and no longer delivers fluid through the conduit 6. Since the valve 49 is not sealing the passage 47, in the raised position of the shifter valve, the latter will move downwardly freely upon the cessation of the pumping of fluid into the chamber 18, until the lower end of the projecting portion 41 contacts the plunger portion 76 of the valve 49, and at the time the communication between the port 51 and the line 13 has, with a desirable proportioning of the parts, been interrupted, with the result that the pressure above the shifter valve will build up to the full amount called for by the setting of the relief valve 71. Thus, even though the shifter valve did not go all the way down to its position shown in Figs. 5 and 6, the pressure would build up to the setting of the relief valve 71 and the cable would be placed under tension, ready for immediate winding in if the vehicle starts to move in a direction in which winding up of the cable will be requisite. If the passage 46, 47 were sealed off slightly before the communication between the passages 51 and 28 was completely interrupted, still, the throttling of the pump discharge could be counted on to cause a sufficient increase in the pressure above the valve 36 to cause the latter to move down to its bottom position.

It will be observed that the valve 49 prevents flow of fluid longitudinally through the valve 36—from the lower to the higher end thereof— until the valve, when upwardly moving, has reached a position in which the groove 40 between its spools comes into communication with the passage 51; and it may further be noted that the strength of the spring 79 is sufficient to cause the plunger 76 to maintain contact with the lower end of the shifter valve and seal the passage through the latter so long as the shifter valve is within the range of movement of the valve 49. In passing it may be noted that fluid locking of the valve 49 is prevented by the provision of adequate clearances around its head 75 and plunger portion 76.

Now referring to the relief valve 14, it will be observed that this includes a valve chamber forming element 85 having a bore 86 in which a two-spool valve 87 is reciprocable. The conduit 15a communicates with an annular groove 88 surrounding and communicating with the valve bore, and another annular groove 89 also communicating with the valve bore is connected by conduit 15b with the conduit 11. The valve 87 has an upper spool 90 and a lower spool 91, these spools being connected by a reduced portion 92 surrounded by an annular groove 92' which in the position of the relief valve shown in Fig. 2 effects a connection between the conduits 15a and 15b, but which in the position of the parts shown in Fig. 1 does not connect the conduits since the spool 90 is then in a position cutting off communication between the annular grooves 88 and 89. Suitable packing devices are provided in association with each spool, as, for example, an annular seal 93 associated with the spool 91 and a packing gland or stuffing box 94 associated with the upper spool 90. A rod 95 is connected to the valve and runs through a guide 96, and carries at its upper end a head 97 against which a spring 98 surrounding the rod and resting on the top of the guide reacts so as to cause the valve to be moved to its position shown in Fig. 2 whenever pressure is removed from the head 97. The head 97 is engageable by a trolley pole 100 pivoted at one end thereof at 101 on a frame 102 which in turn is pivotable about a vertical axis on the vehicle. The trolley is normally held with its outer end in a raised position suited to engagement with the trolley lines, a spring 103 being provided so to hold it and extending between a fixed pin 104 on the frame 102 and an eye 105 in a downturned arm portion 106 on the trolley pole. The trolley pole 100 may be held in depressed position by bringing it under a hook 110 secured to the frame of the car. In the raised position of the trolley pole, as shown in Fig. 2, the valve 87 may move upward to the position shown in Fig. 2 under the action of the spring 98 and interconnect the passages 15a and 15b with the resultant free by-passing of the motor-pump 7. Any suitable means may be provided for limiting the upward movement of the valve 87. Its downward movement will be determined by the position of the trolley arm 100. To limit its upward movement a disc 112 may be secured as by a screw 113 to the lower spool 91 of the valve, this being engageable with the lower end of the valve casing and thus limiting the upward movement of the valve.

It may now be noted that when the by-pass valve 87 is in the position shown in Fig. 2, fluid discharged by the pump 3 will be delivered through the conduit 6 past the valve 22 and through the conduit 15a, the by-pass valve mechanism 14, and conduit 15b to the conduit 11 and so back to the tank, and there will be no substantial back pressure exerted on the pump 3 because of the free discharge resisted only by the spring 23, and accordingly the pump will be relieved of its load and, moreover, the motor-pump device 7 will not exert any winding tendency on the reel. Of course the motor-pump device 7 will not be rotated by the pulling off of cable from the reel because no cable will be pulled off of the reel. Therefore, were it not for the open by-pass valve, there would be a substantial back pressure imposed on the pump 3. However, this is avoided with the present invention; and as the cable 10 will all be wound up on the reel before the car will be propelled by power supplied through the trolley pole, the cable will simply remain wound up, and there will be a material saving in power.

It will of course be appreciated that the trolley pole 100, which is equipped at its outer end 100', with contacts 116 and 117, the contact 116 grooved to follow and cooperate with a trolley wire and the contact 117 flat and relatively wide to allow for reasonable variation in distance between the two trolley wires, constitutes a source of current for the motors of the shuttle car or other vehicle, which source is a parallel one to the cable 10, which is at least a double conductor cable, and may have a ground wire in it also. When the cable 10 is not to be used as a source of current, it will be wound up on the reel 9, and rotation of the reel will not be desired, and the opening of a free communication between the conduits 15a and 15b, as will be the case when the trolley pole is raised and in use, will not only result in there being no driving of the motor-pump device 7, but also in an avoidance of any necessity for the escape, under a substantial pressure, of liquid past the relatively highly loaded relief valve 71. Since the electrical connections by means of which the trolley pole and the cable can be alternatively used as the means for supply of electrical energy to the apparatus is well known per se this specification and the accompanying drawings are not extended by the illustration thereof, the essential features of the invention residing in what is shown, namely a reel driving apparatus having an improved control therefor.

While there is in this application specifically described one form which the invention may assume in practice, it will be understood that this form of the same is shown for purposes of illustration and that the invention may be modified and embodied in various other forms without departing from its spirit or the scope of the appended claims.

What I claim is:

1. In combination, parallel power supply means for a vehicle including a trolley and a cable, a winding reel for said cable, a fluid motor for driving said reel in a direction for winding said cable thereon, a fluid pump for supplying driving fluid to said fluid motor and means controlled by said trolley for interrupting the drive of said fluid motor by the fluid from said fluid pump when said trolley is moved into trolley wire engaging position.

2. In combination, parallel power supply means for a vehicle including a trolley pole and a cable, a winding reel for said cable, a fluid motor for driving said reel in a direction for winding said cable thereon, a fluid pump for supplying driving fluid to said fluid motor, and means controlled by said trolley pole for venting the fluid delivered by said fluid pump when said trolley pole is moved into trolley wire engaging position.

3. In combination, parallel power supply means for a vehicle including a trolley pole and a cable, a winding reel for said cable, a fluid motor for driving said reel in a direction to wind said cable thereon, a fluid pump, a pressure line connecting said pump to said motor, and means controlled by said trolley pole for venting said pressure line when said trolley pole is moved into trolley engaging position.

4. In combination, parallel power supply means for a vehicle including a trolley pole and a cable, a reel for the winding in and paying off of said cable, a fluid motor for driving said reel in a direction to wind cable thereon, a fluid pump, a fluid reservoir, means for conducting fluid from said reservoir to said pump, means for conducting fluid from said pump to said motor, means for conducting fluid from said motor to said reservoir, means for conducting fluid between said second and third mentioned fluid conducting means, and controlling means for said last mentioned means controlled by said trolley pole.

5. In combination, parallel power supply means for a vehicle including a trolley pole and a cable, a reel for the winding in and paying off of said cable, a fluid motor for driving said reel in a direction to wind cable thereon, a fluid pump, a fluid reservoir, means for conducting fluid from said reservoir to said pump, means for conducting fluid from said pump to said motor, means for conducting fluid from said motor to said reservoir, means for conducting fluid between said second and third mentioned means, and valve means in said last mentioned conducting means normally connecting the portions at opposite sides thereof in communication with each other, and said trolley pole so positioned as to move said valve means to closed position on movement of said trolley pole to lowered position.

6. In a power supply system for a moving vehicle, a trolley pole and a cable adapted to constitute alternative power supply means for the vehicle, a winding reel adapted to have the cable wound thereon, a fluid motor for driving said reel in a direction to wind the cable thereon, a fluid pump, and a pressure line connecting said pump to said motor, said motor being rotatable by said winding reel as a pump when cable is pulled off of the reel, means for imposing on said motor when it is driven as a pump a back pressure lower than the pressure applied by said pump to it when it is acting as a motor and driving said reel, automatically operative means for substantially completely relieving the back pressure on said pump when said motor is acting as a pump, and means controlled by the position of said trolley pole when the latter is the effective power supply means for wholly relieving said motor of torque.

7. In a power supply system for a moving vehicle, a trolley pole and a cable adapted to constitute alternative power supply means for the vehicle, a winding reel adapted to have the cable wound thereon, a fluid motor for driving said reel in a direction to wind the cable thereon, a fluid pump, and a pressure line connecting said pump to said motor, said motor being rotatable by said winding reel as a pump when cable is pulled off of the reel, means for imposing on said motor when it is driven as a pump a back pressure lower than the pressure applied by said pump to it when it is acting as a motor and driving said reel, automatically operative means for substantially completely relieving the back pressure on said pump when said motor is acting as a pump, and means controlled by the position of said trolley pole when the latter is the effective power supply means and the reel is rotating in neither direction for substantially completely relieving the pump of back pressure.

8. In combination, parallel power supply means for a vehicle including a trolley pole and a cable, a reel for the winding in and paying off of said cable, a fluid motor for driving said reel in a direction to wind cable thereon, a fluid pump, a fluid reservoir, means for conducting fluid from said reservoir to said pump, means for conducting fluid from said pump to said motor, means for conducting fluid from said motor to said reservoir, means for conducting fluid between said third mentioned fluid conducting means and one of said other fluid conducting means, and controlling means for said last mentioned means controlled by said trolley pole.

9. In a power supply system for a moving vehicle, a cable and a trolley constituting alternative power supply means, a winding reel adapted to have the cable wound thereon, a fluid motor for driving said reel in a direction to wind the cable thereon, a fluid pump, a pressure line connecting said pump to said motor, said motor being rotatable by said winding reel as a pump when cable is pulled off of the reel, means for imposing on said motor when it is driven as a pump a back pressure lower than the pressure applied by said pump to it when it is acting as a motor and driving said reel, automatically operative means for controlling said last means controlled by the fluid discharged by said motor when acting as a pump, and means controlled by the position of said trolley when the latter is the effective power supply means for wholly relieving said motor of torque.

10. In a power supply system for a moving vehicle, a cable and a trolley constituting alternative power supply means, a winding reel adapted to have the cable wound thereon, a fluid motor for driving said reel in a direction to wind the cable thereon, a fluid pump, and a pressure line connecting said pump to said motor, said motor being rotatable by said winding reel as a pump when cable is pulled off of the reel, means for automatically imposing on said motor when it is driven as a pump and on said fluid pump substantially different back pressures when said vehicle is moving in a direction to require the pulling of cable off of the reel, and means controlled by changes in position of said trolley for substantially wholly relieving said motor of torque and said pump of back pressure when said trolley is in a position to act as a power supply means.

11. In a power supply system for a moving vehicle, a cable and a trolley constituting alternative power supply means, a winding reel adapted to have the cable wound upon it, a motor-pump device operable as a motor to drive said reel in a direction to wind the cable thereon, a fluid pump, a pressure line connecting said pump to said motor-pump device, said motor-pump device being rotatable by said winding reel to cause the same to operate as a pump when cable is pulled off of the reel, means for imposing on said motor-pump device a predetermined supply pressure when it is operating as a motor and a lower back pressure when it is being driven by the reel and acting as a pump, including a valve element movable to different positions to effect said changes in pressure and actuated by fluid pumped by said motor-pump device when the latter is driven by the reel, means also including said valve element for substantially wholly relieving the back pressure imposed on said fluid pump when cable is being pulled off of the reel, and means governed by the position of the trolley for substantially wholly relieving said motor of torque and said pump of back pressure when said trolley is acting as the power supply means for the vehicle.

12. In combination, in a power supply system for a moving vehicle, a cable and a trolley constituting alternative power supply means, a winding reel having the cable thereon and adapted to be wound in or paid off, a motor connected to said reel to drive the latter to wind in the cable when supplied with operating medium and to be driven backwards by the reel when cable is pulled off of the reel, means for supplying operating medium to said motor to drive the same to effect winding in of said cable, said operating medium supply means including a device movable to reduce the force required to drive the motor backwards as compared with the force exerted by the motor when driving the reel, means for subjecting opposed surfaces on said device to operating medium delivered by said means for supplying operating medium and to operating medium discharged by said motor when the latter is driven backwards, to control movements thereof, and means controlled by the position of said trolley for substantially wholly relieving said motor of torque whenever said trolley is in its position in which it is effective as the power supply means for the vehicle.

13. In combination, parallel, alternative, power supply means for a vehicle including a trolley and a conductor cable, a winding reel for said cable, a fluid motor for driving said reel in a direction to wind said cable thereon, a continuously driven pump for supplying fluid to said motor, means operative when said cable is the effective power supply means for said vehicle and arranged between said pump and said motor for causing said motor to exert different torques depending upon whether said cable is being wound in by, or drawn off of said reel and for automatically causing said motor to exert maximum torque when said reel is not rotating and means, also arranged between said pump and said motor and responsive to changes in position of said trolley, for automatically venting fluid, whenever said trolley is the effective power supply means, whereby said motor exerts substantially no torque.

14. In combination, parallel, alternative power supply means for a vehicle including a trolley and a cable, a winding reel for said cable, a fluid pressure operated motor for driving said reel in a direction to wind said cable thereon, a pump constituting a source of fluid pressure for said motor, means operative when said cable is the effective power supply means and arranged between said pump and said motor for imposing different limits on the pressure of the fluid supplied by said pump to said motor, respectively when cable is being wound in and being drawn off of said reel and for automatically effecting the subjection of said motor to maximum pressure when said reel is not rotating, and means controlled by movement of said trolley from down to contact-making position for automatically relieving said motor substantially completely of fluid pressure upon the assumption by said trolley of the power supply function.

15. In combination, parallel, alternative, power supply means for a vehicle including a trolley and a cable, a winding reel for said cable, a motor for driving said reel in a direction to wind said cable thereon, means operative when said cable is the effective power supply means for automatically causing said motor to exert different torques depending upon whether said cable is being wound in by or drawn off of said reel, and means controlled by movement of said trolley and including a control element operatively connected with said trolley for control of its position by the trolley as the latter is moved between trolley wire-engaging position and a position in which said trolley is held out of engagement with the trolley wire, and vice versa, for automatically interrupting the exertion of torque by said motor upon the assumption by said trolley of the power supply function.

16. In combination, parallel, alternative, power supply means for a vehicle including a trolley and a cable, a winding reel for said cable, a motor for driving said reel in a direction to wind said cable thereon, means operative when said cable is the effective power supply means for automatically causing said motor to exert different torques depending upon whether said cable is being wound in by or drawn off of said reel and for automatically causing said motor to exert maximum torque when the reel is not rotating, and means including an element actuated by movement of the trolley from down to contact-making position for automatically effecting interruption of the exertion of torque by said motor upon the movement of said trolley from down to contact-making position.

JAMES W. WOOLF.

References Cited in the file of this patent

UNITED STATES PATENTS

| Number | Name | Date |
|---|---|---|
| 797,589 | Levin | Aug. 22, 1905 |
| 853,522 | Shaver | May 14, 1907 |
| 1,845,195 | Scaff | Feb. 16, 1932 |
| 1,976,516 | Renshaw et al. | Oct. 9, 1934 |
| 2,395,302 | Slomer | Feb. 19, 1946 |
| 2,467,238 | Slomer | Apr. 12, 1949 |
| 2,472,860 | Russell | June 14, 1949 |